United States Patent [19]
Peroni

[11] Patent Number: 5,233,870
[45] Date of Patent: Aug. 10, 1993

[54] SINGLE POST STUD WITH LOCKING BLADE

[75] Inventor: Peter A. Peroni, Pottstown, Pa.

[73] Assignee: LaFrance Corporation, Philadelphia, Pa.

[21] Appl. No.: 882,671

[22] Filed: May 14, 1992

[51] Int. Cl.⁵ .......................... G01F 23/02; F16B 19/08
[52] U.S. Cl. ........................................ 73/323; 411/508; 411/913
[58] Field of Search ............... 411/508, 509, 510, 913, 411/908; 73/323, 290 R, 317, 296

[56] References Cited

U.S. PATENT DOCUMENTS

| | | | |
|---|---|---|---|
| D. 293,880 | 1/1988 | Takahashi | 411/913 |
| 2,956,605 | 10/1960 | Rapata | 411/913 |
| 3,009,381 | 11/1961 | Rapata | 411/508 |
| 3,093,874 | 6/1963 | Rapata | 411/508 |
| 3,119,299 | 1/1964 | Sarafinas | 411/508 |
| 3,908,235 | 9/1975 | Telliard et al. | 411/913 |
| 4,524,617 | 6/1985 | Krehel et al. | 73/296 |
| 4,973,212 | 11/1990 | Jacobs | 411/508 |

FOREIGN PATENT DOCUMENTS 1234965  6/1971  United Kingdom ................ 411/508

Primary Examiner—William A. Cuchlinski, Jr.
Assistant Examiner—G. Bradley Bennett
Attorney, Agent, or Firm—Connolly & Hutz

[57] ABSTRACT

A locking stud for securing a plate to a support member includes a single post connected to and disposed outwardly from the plate. A single locking blade is connected to and disposed outwardly from the post on one side of and spaced from the axial center line of the post. The stud is completely open in the space opposite the locking blade. The locking blade includes an outwardly disposed arcuate surface which terminates in a crest edge and functions as a wedge lock when disposed against the edge of a hole in the support member. An inwardly disposed arcuate surface extends from the crest edge. The blade is deflectable at the inwardly disposed arcuate surface so that the inwardly disposed arcuate surface functions as a cam during insertion of the blade into the support member hole. When fully inserted the outwardly disposed arcuate surface is wedged against the hole to effectively prevent removal of the stud from the hole.

16 Claims, 3 Drawing Sheets

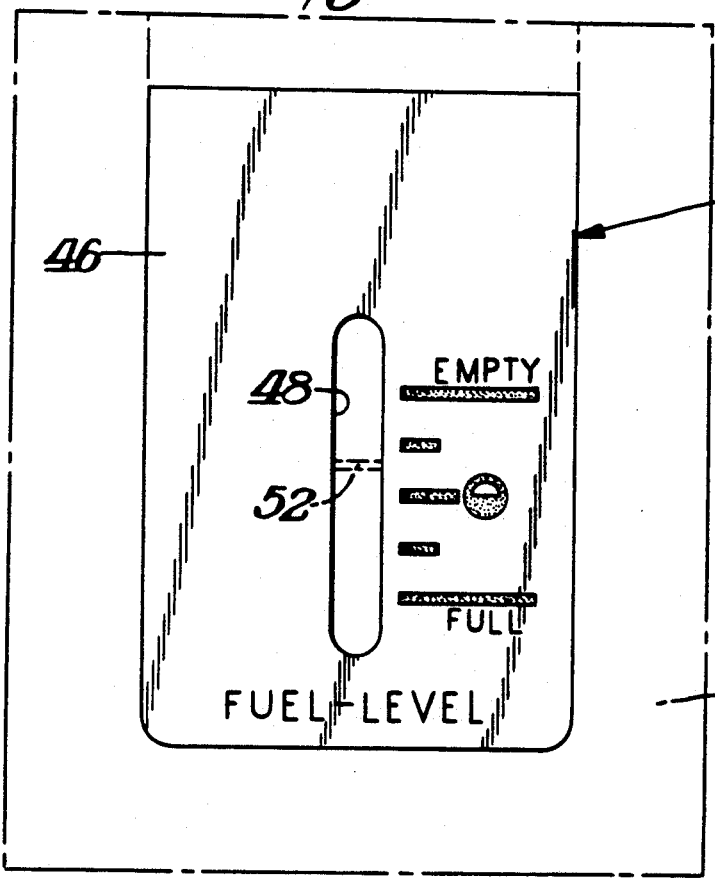
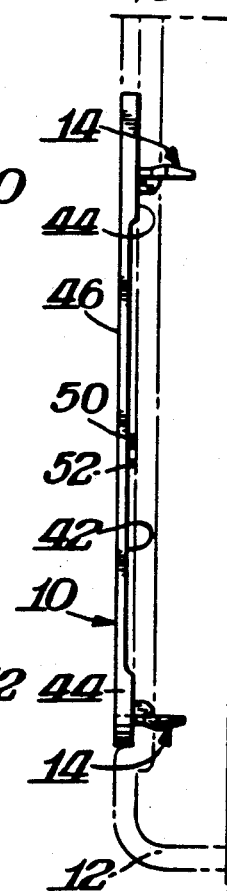
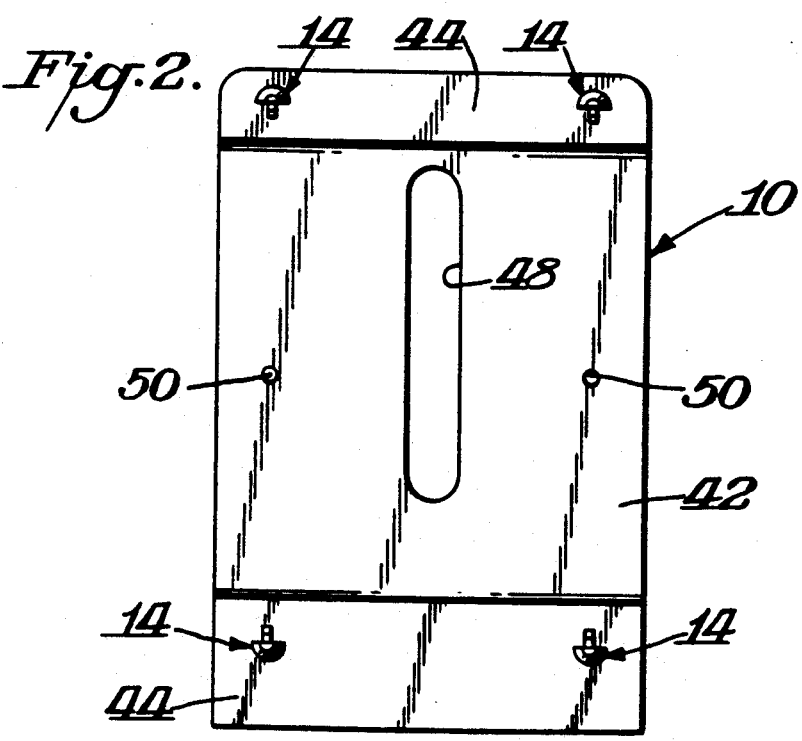

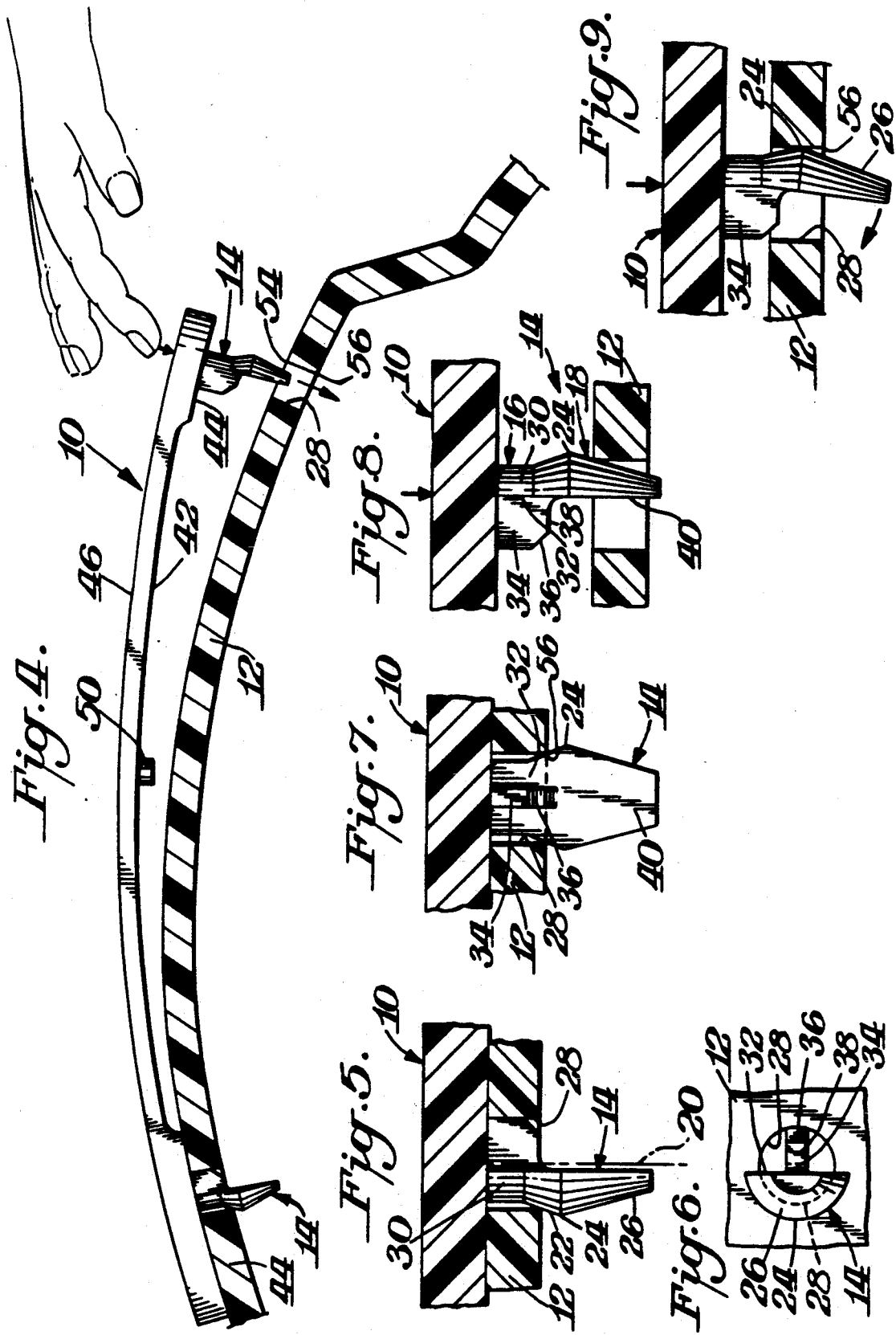

SINGLE POST STUD WITH LOCKING BLADE

BACKGROUND OF THE INVENTION

There are various applications where it is necessary to mount a member, such as a plate to another member. For example, propane tank holders are provided with plates to indicate the level of propane in the tank. Generally, such plates are mounted to the tank holder by a locking stud arrangement. The conventional form for each such locking stud is to provide a post having an axial slot thereby creating a pair of side by side spaced blades of split pin form. In practice it is necessary to accurately position the blade for fitting into the propane tank holder which functions as a support member for the plate. Where the plate includes a plurality of such studs extreme care must be taken to assure that all of the studs are properly aligned with the corresponding holes. Even where there is proper insertion, however, such arrangements are not completely effective because the material can cold flow after insertion which would decrease the effectiveness of its holding ability even to the point of ceasing to hold the plate in place.

A further disadvantage with the conventional slip pin type locking stud is the difficulty in tooling with respect to problems of collapsing the core.

SUMMARY OF THE INVENTION

An object of this invention is to provide a locking stud which overcomes the disadvantages of the conventional split pin locking studs used by the prior art.

A further object of this invention is to provide such a locking stud which could be made integral with the plate and provide ease of tooling.

A still further object of this invention is to provide a plurality of such locking studs on a plate wherein the precision required for locking the studs with the corresponding holes is not as great as with the prior art.

In accordance with this invention, a locking assembly includes at least one locking stud mounted to an abutment member which is preferably a plate to be mounted to a support member. The locking stud is in the form of a post disposed outwardly from the abutment member and having a single locking blade which is located completely on one side of the axial center line of the post. The stud is completely open in the space opposite the locking blade. The locking blade includes a first outwardly disposed arcuate surface which terminates in a crest edge and which functions as a wedge lock means when mounted in place. An inwardly disposed arcuate surface extends from the crest edge and is deflectable so as to function as cam means during insertion of the blade into a corresponding hole. The blade would deflect until the crest edge has passed beyond the hole during insertion whereupon the wedge lock means prevents removal of the stud from the hole.

In a preferred practice of this invention at least one other locking stud is provided on the plate for functioning as an indexing member. The arcuate surfaces of both locking studs are disposed remote from each other for ease of molding.

The plate is preferably a name plate having a recess extending over a portion of its inner surface with a slot extending completely through the nameplate at the recess. Indicia is preferably provided on the nameplate for indicating the level of fluid in the support member where the support member is, for example, a propane tank holder. The indicator may extend across the slot in the recess for indicating the fluid level.

THE DRAWINGS

FIG. 1 is a front elevational view of a locking assembly including a plate incorporating the locking studs of this invention;

FIG. 2 is a rear elevational view of the plate shown in FIG. 1;

FIG. 3 is a side elevational view of the plate shown in FIGS. 1-2;

FIG. 4 is a cross-sectional view in elevation showing a step in the mounting of the plate shown in FIGS. 1-3;

FIG. 5 is a cross-sectional view in elevation showing the final mounting arrangement of a locking stud mounted on the plate shown in FIGS. 1-4;

FIG. 6 is a plan view of the locking stud shown in FIG. 5;

FIG. 7 is a front elevational view of the locking stud shown in FIGS. 5-6;

FIG. 8 is a cross-sectional view similar to FIG. 5 showing a further step in the mounting of the stud which is initially shown being mounted in FIG. 4;

FIG. 9 is a cross-sectional view in elevation similar to FIG. 8 showing a still further step in the mounting of the stud of FIGS. 4-8;

DETAILED DESCRIPTION

Figure 10:
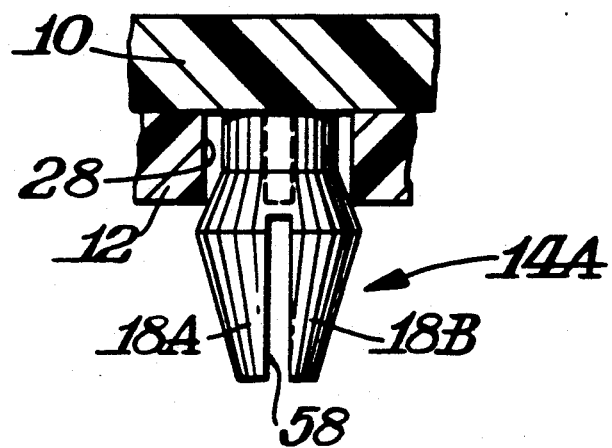
FIG. 10 is a cross-sectional view in elevation of an alternative form of locking stud in accordance with this invention.

The present invention is directed to a locking stud for securing a member, such as a plate to a support member. The concepts of this invention may be practiced wherever there is a need to mount one member to another. In general, the invention is directed to the structure of the locking stud itself, although there is a certain inter-relationship between features of the locking stud and the abutment member or plate as well as the support member. It is to be understood, however, that the concepts of this invention are not limited to mounting plates to a support member.

For purposes of illustration, the invention will be described in connection with the mounting of an abutment member 10 to a support member 12. As described herein the abutment member 10 is a plate and more particularly a nameplate which is mounted to the surface of a propane tank holder which comprises the support member 12. Mounting is accomplished by means of a plurality of locking studs 14 which form the main features of this invention. As indicated above, the locking stud may be used for any mounting purpose where an effective mounting is desired. Accordingly, the support member may take any suitable form and is not intended to be limited to a propane tank holder. Similarly, the abutment member may take any suitable form and is not limited to a nameplate. The concepts of this invention, however, may be practiced where the abutment member is an enlarged head on the locking stud or is a washer or is any other form of enlarged member having a larger dimension than the maximum lateral dimension of locking member 14.

As best shown in FIGS. 4-9 the locking stud comprises a post 16 connected to and exposed outwardly from plate 10. Preferably post 16 is integrally molded with plate 14. A single locking blade 18 is disposed on one side of and spaced from the axial center line 20 of stud 14 (FIG. 5). The stud is completely open in the space opposite the single locking blade as clearly shown, for example, in FIGS. 4, 5, 8 and 9. The locking blade 18 includes a first outwardly exposed arcuate surface 22 which terminates in a crest edge 24. As later described the arcuate surface 22 functions as wedge lock means when mounted in the position shown in FIG. 5 to effectively prevent stud 14 from being withdrawn from hole 28 in support member 12.

A second arcuate surface 26 extends inwardly from crest edge 24 and forms the free end of blade 18. Arcuate surface 26 functions as cam means during insertion of the blade into hole 28.

Since locking stud 14 would be mounted through a hole larger than the locking stud itself, the invention is preferably practiced by the use of an indexing member connect the plate to the support member so that the locking stud 14 is prevented from shifting. In the preferred practice of the invention, the indexing member is a second locking stud integral with plate 10. It is to be understood, however, that any other form of indexing member may be used such as, for example, a screw, clamp or other fastener which would mount plate 10 fixed at one location so that locking stud 14 would function in the later described manner to effectively maintain plate 10 in place.

As best shown in FIGS. 2–4 where a plurality of locking studs 14 are used the arcuate surfaces are disposed remote from each other and the flat surfaces face each other. Thus, where for example two sets of locking studs 14 are used, as illustrated in FIG. 2, each set would be arranged with its arcuate surfaces remote from each other. This arrangement provides ease of and low cost tooling where the locking studs are molded integrally with plate 10. In the molding the core would move in a direction of top to bottom with respect to the structure shown in FIG. 2. Preferably plate 10 and studs 14 are molded from ABS plastic.

In the preferred practice of this invention, post 16 is of generally T-shape as best shown in FIGS. 2 and 6 and includes an enlarged arcuate portion 30 which is a segment of a cylinder with a pair of flat faces 32 having a central wall 34 extending outwardly from flat faces 32. Wall 34 has a notched corner 36 joined to outer surface 38 which extends beyond the center line 20 and merges with the flat face 40 of blade 18.

As best shown in FIGS. 2–4 plate 10 includes an enlarged recessed area 42 at its underside with thickened end portions 44,44 at which studs 14,14 are located. Where plate 10 functions as a nameplate for use in indicating the level of fluid in a housing, such as a propane tank, indicia would be provided on the outer surface 46 remote from recessed surface 42. Plate 10 would also include a longitudinal slot 48 extending over the length of the fluid level indicia. An indicator wand 52 or other indicator would be associated with plate 10 to extend across slot 48 and move in accordance with the level of fluid in tank 12. Any suitable conventional means could be used for mounting the indicator wand 52. For example, as illustrated in FIG. 2 a pair of pins 50 are molded in recessed surface 42 onto which any suitable level indicator 52 may be mounted in a known manner.

Plate 10 is preferably made of a semi-rigid material having enough flexibility to permit a bending of the plate as illustrated in FIG. 4 while generally maintaining its shape. Thus, plate 10 as later described could be used where housing 12 is of the illustrated arcuate form or is of flat form. Housing 12 itself may be rigid or could have some degree of flexibility.

FIGS. 4, 8, 9 and 5 illustrate the sequence in mounting locking stud 14 to support member 12. As shown in FIG. 4 a first locking stud 14 is mounted in one of the holes 28 provided for it in support member 12. The first mounting stud 14 can be easily inserted directly into the hole and functions as an indexing member to anchor one end of plate 10 to support member 12. This is illustrated by stud 14 in the left-hand portion of FIG. 4.

When the first stud 14 is mounted in its appropriate hole the remaining studs 14 are then generally aligned with their corresponding holes 28. A downward force is applied to nameplate 10 as shown in the right-hand portion of FIG. 4 to insert the next stud into its corresponding hole 28. During the downward movement of stud 14 into hole 28 arcuate camming portion 26 initially enters the hole as shown in FIG. 4. The downward movement continues unimpaired until arcuate portion 26 begins to contact an edge 54 of hole 28, as illustrated in FIG. 8. The continued application of force causes deflection of blade 18 with arcuate surface 26 acting as a camming means as shown in FIG. 9. The deflection is sufficient to permit crest edge 24 to slide along the surface of hole 28 until crest edge 24 passes the remote edge 56 of hole 28.

Once crest edge 26 passes through hole 28 blade 18 returns toward its original undeflected condition. The extent that blade 18 returns to its undeflected condition would depend upon the thickness of support member 12 which would determine the portion of stud 14 remaining within hole 28 and the portion of stud 14 extending beyond hole 28.

FIG. 5 illustrates stud 14 in its final mounting position. As shown therein arcuate surface 22 is disposed against edge 56 of hole 28 and functions as an effective wedge which in conjunction with the indexing member to securely lock plate 10 in place against support member 12. Where more than two studs 14 are used the process described with respect to FIGS. 4, 8, 9 and 5 is repeated for each subsequent stud.

Locking stud 14 provides a number of distinct advantages. For example, stud 14 is not completely thickness dependent but could be used in connection with holes of various thicknesses because of the camming and wedge surfaces. For example, stud 14 has an overall length of 0.35 inches with the blade itself being 0.25 inches and with the axial distance of post 16 being 0.08 inches and the axial distance of wedge surface 22 being 0.082 inches. When stud 14 is so dimensioned, it could be used in connection with any member 12 having holes up to ¼ inch thick. By forming stud 14 with other dimensions other size holes could be accommodated.

Figure 11:
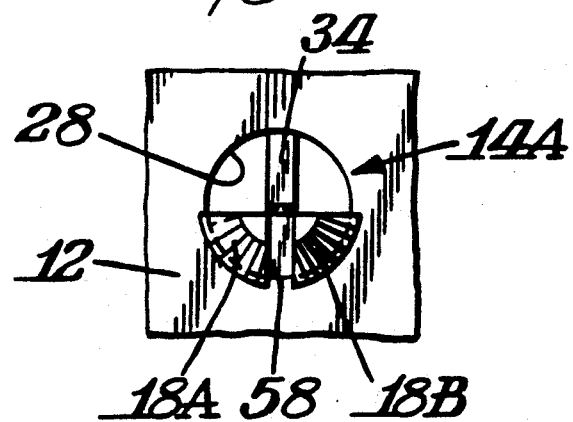
FIG. 11 is a plan view of the locking stud shown in FIG. 10.

FIGS. 11–12 show an alternative form of this invention wherein the locking stud 14A again includes a single blade which is disposed entirely on one side of the axial center line of stud 14A. The blade, however, has a slot 58 so as to form a pair of blade portions 18A,18B. This arrangement would function identically with blade 18 except there would be slightly more deflectability of the blade as a result of its split construction.

What is claimed is:

1. A locking assembly for securement through a hole in a support member comprising an abutment member, a locking stud having a post connected to and disposed outwardly from said abutment member, said post having an axial centerline, a single locking blade connected to and disposed outwardly from said post, said locking blade being disposed on one side of and spaced from said axial centerline, said stud being completely open in the space opposite said locking blade creating an air space over the entire volume of said stud outwardly of said post and inwardly of said single locking blade, said locking blade including an outwardly disposed arcuate surface terminating in a crest edge, said outwardly disposed arcuate surface comprising wedge lock means for being disposed against an edge of the hole in the support member, an inwardly disposed arcuate surface extending from said crest edge, said blade being deflectable at said inwardly disposed arcuate surface, said inwardly disposed arcuate surface comprising cam means whereby insertion of said blade into the hole causes an edge of the hole to press against said cam means and deflect said blade until said crest edge has passed beyond the hole with said wedge lock means preventing removal of said stud from the hole, and including an indexing member secured to said abutment member on the same side of said abutment member as said locking stud securing said abutment member to the support member at a location remote from said locking stud.

2. The locking assembly of claim 1 wherein said locking stud comprises a first locking stud, and said indexing member comprising a second locking stud having identical structure to said first locking stud.

3. The locking assembly of claim 2 wherein said arcuate surfaces of said first and said second locking studs are disposed remote from each other.

4. The locking assembly of claim 3 wherein said each of said arcuate surfaces has a uniform radius forming a portion of a circle.

5. The locking assembly of claim 4 wherein said abutment member is a plate.

6. The locking assembly of claim 5 wherein said locking studs are integral with said plate, said plate having an outer side and an inner side, and said locking studs extending outwardly from said inner side.

7. The locking assembly of claim 6 wherein said plate is made of a semi-rigid material capable of being bent from its equilibrium condition.

8. The locking assembly of claim 8 wherein said inner surface of said plate includes a recessed area and a thickened portion at each end of said recessed area, and each of said locking studs extending from a respective one of said thickened portions.

9. The locking assembly of claim 8 wherein said plate is a nameplate having indicia on said outer surface, and an elongated slot in said nameplate extending through said nameplate in said recessed area.

10. The locking assembly of claim 9 in combination with said support member, said support member being a housing wall, and an indicator wand mounted in said recessed area extending across said slot.

11. The locking assembly of claim 10 wherein said housing wall is arcuate.

12. The locking assembly of claim 10, wherein said housing wall is flat.

13. The locking assembly of claim 10 wherein said housing wall is a wall of a fluid tank holder, and said indicia indicating the quantity of fluid in said tank.

14. The locking assembly of claim 6 wherein said first locking stud and said second locking stud comprises a first set of locking studs, a second set of locking studs extending outwardly from said abutment member on the same side of said abutment member as said first set of locking studs, and a locking stud of each of said sets being aligned with a corresponding locking stud of the other of said sets.

15. The locking assembly of claim 14 wherein each of said blades includes a flat face disposed opposite said arcuate surfaces, said posts being in the form of a portion of a cylinder having a flat face with a narrow wall disposed perpendicular to said flat face.

16. The locking assembly of claim 15 wherein said plate is a nameplate having indicia on said outer surface, and an elongated slot in said nameplate extending through said nameplate in said recessed area.

* * * * *